United States Patent [19]

Neff et al.

[11] 4,079,698
[45] Mar. 21, 1978

[54] AQUATIC ANIMAL CAGE

[75] Inventors: Gregor N. Neff, 85 Myrtle Ave., Dobbs Ferry, N.Y. 10522; Paul C. Barrett, Homestead, Fla.

[73] Assignee: Gregor N. Neff, Dobbs Ferry, N.Y.

[21] Appl. No.: 680,367

[22] Filed: Apr. 26, 1976

Related U.S. Application Data

[63] Continuation-in-part of Ser. No. 545,149, Jan. 29, 1975, Pat. No. 4,003,338.

[51] Int. Cl.² .............................................. A01K 63/00
[52] U.S. Cl. ........................................... 119/3; 43/55
[58] Field of Search ................... 119/3; 43/55; 220/80

[56] References Cited

U.S. PATENT DOCUMENTS

| 2,722,770 | 11/1955 | Giordano | 43/55 |
| 2,795,889 | 6/1957 | Garland | 43/55 |
| 2,823,821 | 2/1958 | Frater et al. | 220/80 X |
| 2,847,794 | 8/1958 | Loud et al. | 43/55 |

Primary Examiner—Hugh R. Chamblee
Attorney, Agent, or Firm—Curtis, Morris & Safford

[57] ABSTRACT

The cage is made of netting panels forming a basket and flotation material secured to a frame. The frame is made of split tubing, with the edges of the netting inserted into the gap left by the split and secured within the tubing. Seams between netting panels of the basket are formed in the same manner. The tubing can be metallic or flexible plastic tubing with a steel rod inside. The edge of a metallic top for the cage can be secured in the plastic tubing instead. Netting material can be used for the top of the cage, with the flotation material underneath and secured to the netting top. The flotation material also provides shade for the aquatic animals in the cage. An H-shaped metal frame structure preferably is used to provide added strength for the cage top, and to provide a support for a hinged lid.

19 Claims, 12 Drawing Figures

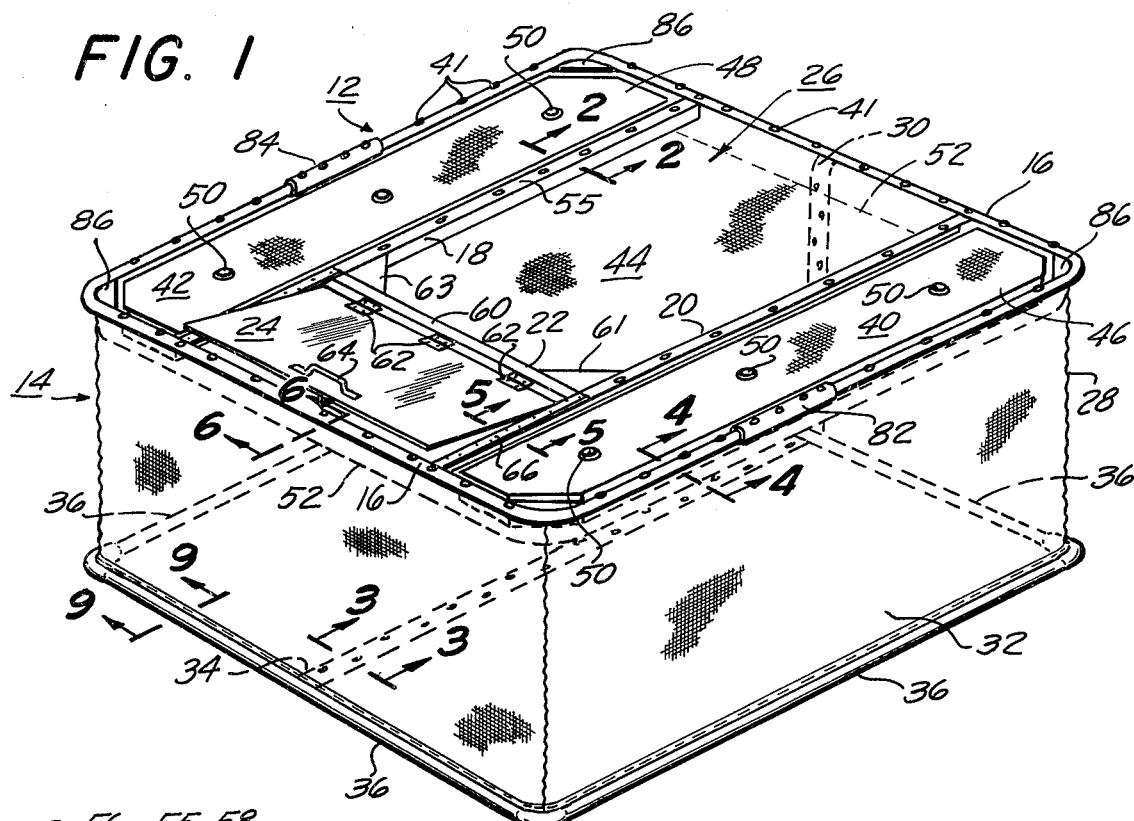
FIG. 1
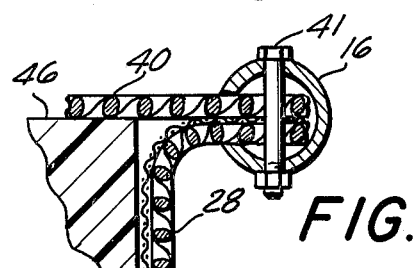
FIG. 2
FIG. 3
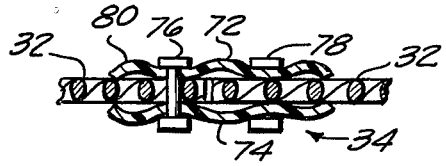
FIG. 4  FIG. 5
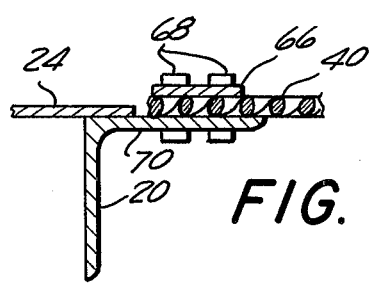
FIG. 6  FIG. 9

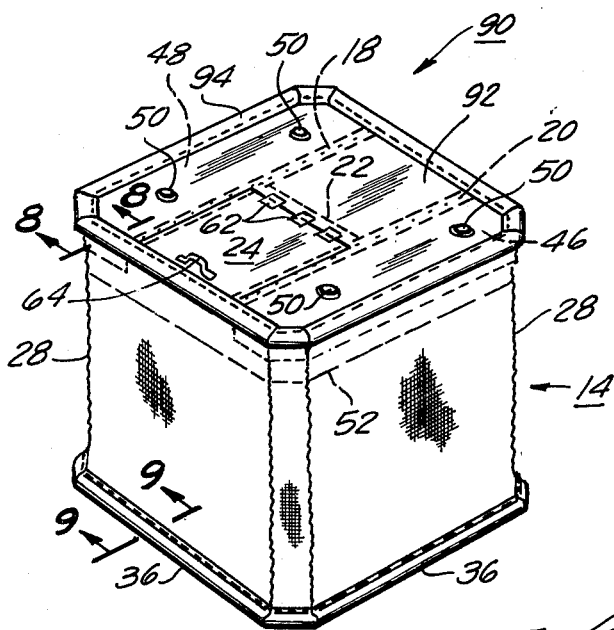
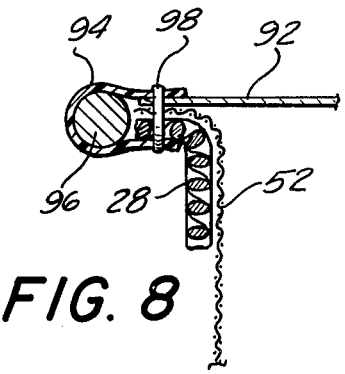
FIG. 7
FIG. 8
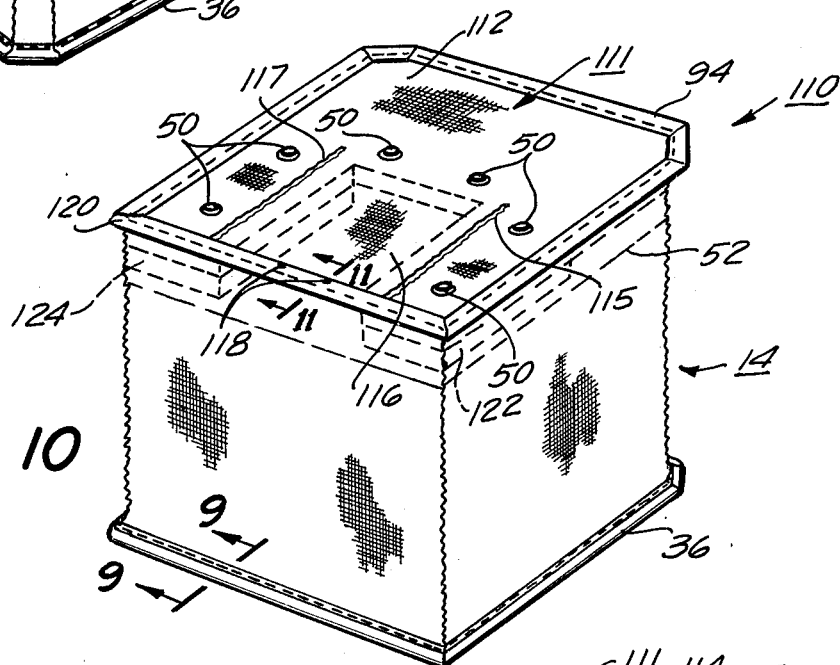
FIG. 10
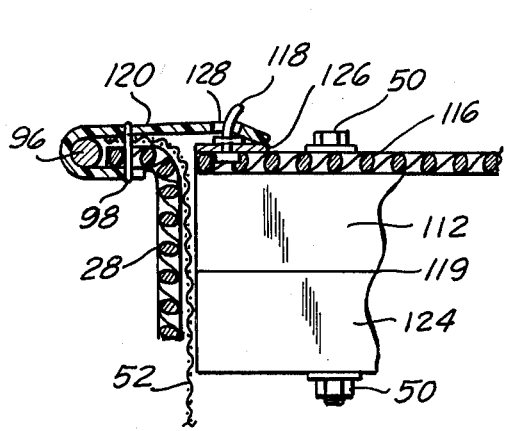
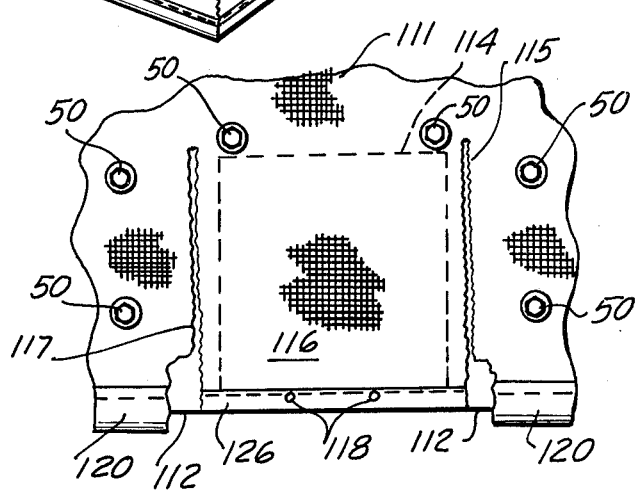
FIG. 11
FIG. 12

AQUATIC ANIMAL CAGE

This invention relates to cages for aquatic animals such as fish. This application is a continuation-in-part of our U.S. patent application Ser. No. 545,149, filed Jan. 29, 1975, now U.S. Pat. No. 4,003,338, and entitled "Aquatic Animal Cage and Fabrication Method". The disclosure of that patent application hereby is incorporated herein by reference.

Although the cage described in our above-identified patent application has many desirable features and is relatively economical to build, it is an object of this invention to simplify and improve the cage construction even further, and to reduce its manufacturing costs.

In accordance with the present invention, the foregoing objectives are met by the provision, in one embodiment, of a cage using an elongated flexible member with a re-entrant cross-sectional shape (e.g. split plastic tubing) rather than split rigid material such as metal pipe. Preferably, reinforcing metal is inserted in the tubing to stiffen it. This metal can be steel rod, for example, or an aluminum sheet used to form the cage top. Also, the top of the cage can be formed of netting instead of aluminum, with the floats underneath the netting. Thus, the netting top hangs on the floats. The floats preferably cover a relatively broad surface area on the water so as to provide shade for the aquatic animals as well as buoyant support for the cage. The netting top provides a very large feed hole, thus making it easier and faster to feed the animals. The resulting cage is lighter in weight for the same volume and generally is more economical to manufacture than in the past. The bottom seam of the cage preferably is made of split plastic tubing with a metal rod inside to keep it straight and to weight the netting to cause it to hang downwardly straighter.

The foregoing and other objects and advantages of the invention will be set forth in or apparent from the following description and drawings. In the drawings:

FIGS. 1, 7 and 10 are perspective views of cages constructed in accordance with the present invention, FIGS. 2, 3, 4, 5, 6, 8, 9 and 11 are cross-sectional, partially-broken away views taken along the sections lines bearing corresponding numerals in FIGS. 1, 7 and 10; and FIG. 12 is a plan view of a portion of the cage shown in FIG. 10.

FIG. 1 shows a cage 10 which includes a frame 12, a basket 14 and floats 46 and 48 to support the cage on a body of water with the basket 14 immersed in the water.

The frame 12 includes a square outer rim 16 made of two U-shaped sections of aluminum pipe (see FIG. 4) which are bent and coupled together by means of couplings 82 and 84. As in our prior patent application, the pipe 16 is slotted to form a longitudinal gap into which are inserted the top edges of the netting forming the basket 14.

The basket 14 is composed of a single panel 28 of netting which is wrapped completely around to form the vertical side walls of the cage, with a vertical seam 30 at the rear of the cage, and two bottom panels 32 joined together by a seam 34. The bottom panels are joined to the side walls at an edge seam 36 whose construction is shown in detail in FIG. 9.

Referring again to FIG. 1, and also to FIGS. 2 and 5, the frame 12 includes a generally H-shaped structure consisting of three lengths 18, 20 and 22 of aluminum angle. The short cross angle 22 is fastened between the two long angles 18 and 20, and the junctions between those angles are braced by means of gussetts 61 and 63. An aluminum lid 24 is secured by means of hinges 62 to the cross angle 22. The ends of the angles 18 and 20 are notched so that the end of the upper web 54 or 70 of the angle is exposed (see FIG. 2 and FIG. 5). The exposed end is inserted into the slot in the pipe 16 and bolted in place, thus securing the outer frame section to the H-shaped frame section.

The top of the cage 10 is covered with three panels 40, 42 and 44 of netting. As it is shown in FIG. 4, the edges of the netting panels are inserted into the slots in the pipe 16 along with the top edge of the side panel 28. Bolts 41 are inserted through holes drilled through the pipe and are tightened to clamp the edges of the pipe onto the edges of the netting to hold the netting tightly in place.

As it is shown in FIG. 2, the netting panels 42 and 44 are secured to the upper web 54 of the angle 18. The edges of the panels 42 and 44 abut one another in the center of the web 54, an aluminum strip 55 is laid over the junction between the netting edges, and rivets 56 and 58 are applied to hold the edges of the netting between the strip 55 and the upper web 54 of the angle 18. The edges of the panel 40 and the near edge of the panel 44 are fastened to the top of angle 20 in a similar fashion. The forward edge of netting panel 44 is secured in a similar manner to the top of angle 22.

FIG. 5 shows the manner in which the panel 40 is secured adjacent the edge of the lid 24. A relatively narrow aluminum strip 66 and rivets 68 are used to secure the edge of the panel 40 to the right-hand portion of the top web 70 of the angle 20. The lid 24 is somewhat wider than the space between the angles 18 and 20, so that the edges of the lid overlap onto and rest upon the top of angles 18 and 20.

FIG. 6 shows how the forward edge of the lid is supported on a ledge 51 formed by the downwardly-bent portion of the side-wall 28 of the netting. Since the netting preferably is made of fairly stiff polyethylene or polypropylene "Vexar" netting made by DuPont, this provides a very stable support for the front edge of the lid 24. If more shade is desired for the fish, additional aluminum sheets can be added between the angles 18 and 20.

Referring to FIGS. 4 and 6, as well as FIG. 1, a strip of fiberglass window screen 52 is secured in the slot in the pipe 16 with the ends of Vexar panels 28 and 40 in order to form a "feed skirt". The feed skirt 52 extends downwardly about 1 foot all the way around the inside of the cage. The skirt 52 has a mesh size substantially smaller than that of the netting forming the walls 28 and keeps floating food pellets from being thrown out of the cage by actively feeding fish.

The floats 46 and 48 preferably are made of a plastic foam such as closed-cell polystyrene, polypropylene or polyethylene. Each flow is designed to substantially fill the space between one of the angles 18 or 20 and the side-rail 16 of the cage. Each float is secured in place by means of bolts 50 passing through the float material with a nut on each lower end and a large washer on each end to hold the bolt to the Vexar and the float material and prevent the bolt from passing through the relatively soft float material. In effect, the cage hangs on the floats, with the netting on the top of the cage providing the necessary support. Also, the floats cover a relatively wide area, thus also providing, along with the lid 24, some shade for the aquatic animals in the cage.

The cage 10 has the further advantage that it has a very large opening through which feed can be thrown to the aquatic animals inside. This opening is defined by the angles 18, 20 and 22 and the back rail 16 of the cage frame. Preferably, it is covered with netting 44 whose mesh size is large enough to admit food pellets of the size desired to feed the fish or other animals in the cage.

The cage structure shown in FIG. 1 is advantageous for the further reason that the top is especially lightweight. This makes it possible to use smaller and less costly pipe 16 and angles for the frame, thus further reducing the weight of the cage. The preferred embodiment of the cage 10 is 8 feet wide by 8 feet long on the top, and is 4 feet deep. The relatively light weight of the cage makes it relatively easy to handle despite its size. The cage is relatively economical to build and use.

Referring now to FIG. 3, the bottom seam 34 consists of two relatively thick sheets 72 and 74 of black polyethylene plastic fastened to the edges of the panels 32 by means of large-headed non-corrodable rivets 76 and 78. The sheets 72 and 74 are formed by completely splitting longitudinally a tube of relatively large diameter. The resulting sheets 72 and 74 are curved. The curvature of each part is arranged with the concave surface facing the netting, and the rivets 76 and 78 are then applied at spaced, staggered intervals. This tends to flatten the curved sheets 72 and 74, but also uses the natural resilience of the material to hold the edges 80 of the material against the netting to form a tight seal and prevent the formation of gaps between the netting and the sheets 72 and 74.

The vertical seam 30 has a construction identical to that of the bottom seam 34.

FIG. 9 shows the construction of the bottom edge seam 36 for the cage 10. The seam 36 is formed by first slitting a flexible polyethylene tube 102 longitudinally, inserting the lower edges of the netting panels 32 and 28 into the tube, and driving staples through the opposite sides of the tube and the ends of the netting inside the tube, as in the cage of our prior patent application.

In accordance with one feature of the invention, a metal rod 100 is inserted into the tube 102 along with the edges of the netting. This rod stiffens the flexible plastic tubing and adds weight to the bottom edge of the cage so as to tend to straighten the sides of the cage. The rod 100 can be bent to form a square hoop with the shape of the top frame 16. However, it is preferred that four straight rods 100 be used, one in each of the four straight sections of the bottom seam, each rod being shorter than the section in which it is located. Such rods usually are easier to form and insert than one continuous bent hoop would be.

The particular netting configuration on the top of the cage 10 in FIG. 1 also is advantageous in that it allows the application of netting substantially without waste. This is true because the distance between the angles 18 and 20 is made approximately equal to the width (4 feet) of a standard roll of "Vexar" netting, and the width of the spaces in which the floats 46 and 48 are located is made equal to one half of the standard width. This permits simply splitting a length of netting to form the panels 40 and 42 over the floats, and using a whole panel to cover the area 44. Of course, other netting arrangements also are within the scope of this invention.

If desired, flat seams like seam 34 can be used to secure the edges of the panels 40, 44 and 42 together at the location of the angles 18 and 20, and then the seam material can be fastened to the top of those angles instead of using the aluminum strip 55.

A further simplification of the cage 10 shown in FIG. 1 can be provided by eliminating the H-frame structure and the lid 24, and simply cutting a flap in the top netting material to form a netting lid for the cage.

One aspect of the present invention is the discovery that flexible plastic tubing with a stiff rod inserted inside of its can be used under many circumstances as a substitute for the split pipe shown on FIG. 4. The rod material can be a non-corrodable metal or other stiff, heavy material, but preferably is steel or iron or another low-cost but corrodable metal. Such materials can be used because the rod's thickness precluded excessive weakening due to corrosion over the normal life of the cage. For example, steel concrete reinforcing rod ⅜ inch in diameter is a low-cost metal which is quite satisfactory. This construction can produce substantial economies.

FIG. 7 illustrates a cage which takes advantage of some of the above-mentioned economies. The cage depicted in FIG. 7 is substantially the same as that shown in FIG. 1, except for the relative dimensions, and other differences to be mentioned below, and the same reference numerals are used for corresponding parts in both FIGS. 1 and 7.

The cage 90 has a relatively thin aluminum cover 92 over the entire top. The top 92 is secured to an H-shaped frame composed of angles 1, 20 and 22, as in the cage of FIG. 1. Other than the provision of a continuous aluminum top for the cage 90, the principal difference between it and the cage 10 of FIG. 1 lies in the method of attaching the basket 14 to the cage top. This is done by inserting the top edge of the netting panels into a split plastic tubing 94 the same as the tubing 102 used on the bottom seams 36 of the cage. The edge of the aluminum sheet 92 is inserted into the same slot as the netting edges, and staples are driven through the aluminum sheet, through both sides of the flattened tubing, and through the top edge of the netting, thus securely holding these elements together. This attachment structure and method is relatively simple and fast to use. Moreover, it has been found that the netting is held securely in place to the aluminum. For the purposes of this stapling operation, a heavy-duty stapling gun is recommended; one which is specially designed to pierce sheet metal. The use of stainless steel staples is recommended, both for their structural strength and for their resistance to corrosion.

The front edge of the cage 90 is shown in FIG. 8 and has a special construction. In addition to staples 98 driven through the tubing 94 and the metal sheet 92, as well as the upper edge of the netting and feed skirt 52, a steel rod 96 is inserted in the tube 94 to give it additional stiffness so that it will not sag and will support the forward edge of the lid 24.

The lid 24 preferably is cut out of the square sheet of metal used to form the top 92. The edges of the lid 24, as in the cage 10 shown in FIG. 1, overlap onto the angles 18 and 20 which form ledges to support the edges of the lid when it is closed.

The ends of the upper webs of the angles 18 and 20 are inserted into the slit in the plastic tubing 94.

The H-shaped frame used in cages 10 and 90 has the advantage that it provides great strength in the direction in which it is most needed for fish cages. Fish cages often are harvested by tipping them up on their front edges against a dock or against the shore in order to concentrate the fish in one corner of the cage so that they can be dipped out with dip nets more easily. The stress of such tipping on the top frame of the cage can be considerable. In accordance with this invention, the forces causing the stress are applied longitudinally to the angle members 18 and 20, and those angles have great strength and resistance to distortion due to such longitudinal forces. Thus, the H-shaped frame permits the use of a softer, less expensive top for the cage without loss of strength in the critical direction.

FIGS. 10 through 12 show another cage 110 constructed in accordance with the invention. The cage 110 is like the cages 10 and 90 shown in FIGS. 1 and 7, and the same reference numerals are used for corresponding parts.

The cage 110 has a netting top 111 like the cage 10, and a top seam 94 of plastic tubing like the cage 90 of FIG. 7. The top of the cage is formed by a square slab 112 of flotation material out of which a square hole 114 has been cut. The outside dimensions of the float slab 112 are slightly less than those of the inside of the cage.

The netting top 111 has a flap 116 formed by cuts 115 and 117 extending to the rear edge of the hole 114. The flap is closed by means of a pair of latch pins 118 which are secured to a stiff aluminum strip 126 (see FIGS. 11 and 12). The pins 118 extend upwardly through holes 128 in the overhanging edge of the front seam structure 120 of the cage.

The front seam structure 120 includes a split plastic tube or pipe of relatively larger diameter than the tubing forming the other seams of the cage. The upper edge of the tube is allowed to extend outwardly so as to overlap the netting top 111 and float structure 112 by a substantial distance.

As it is shown in FIG. 12, the metal strip 126 is stapled to the front edge of the netting flap 116 and overlaps the edges of the float structure so as to provide a ledge to support the front seam 120 and the front edge of the flap 116.

The flap 116 is opened by lifting the inner edges of front seam 120 to disengage the pins 118 from the holes 128. Then the flap 116 can be bent backwardly to permit access to the hole 114. The flap 116 is closed by lifting the seam edge and inserting the strip 126 under the seam edge and inserting the pins 118 through the holes 128. The concave (inside) surface of the split pipe forming the seam 120 faces downwardly so that the natural resiliency of the pipe material urges it downwardly to form a tight closure for the cage, and keeps the pins 118 engaged with the holes 128. The seam 120 has a metal rod 96 in it to stiffen it, if the seam 120 itself is not stiff enough. The pins 118 and rear anchor bolts 50 hold the front and back edges of the flap so as to stretch it tight and keep it from sagging excessively.

Preferably, the width of the hole 114 (measured across the front of the cage) is one half the width of the cage. This makes it possible to form the float structure from a single square sheet of material, cutting the hole 114, and then splitting the square cut-out block of material into two blocks 122 and 124 of equal width. These blocks then are secured underneath the forwardly-extending portions of the slab 112 in the manner shown in FIGS. 10 and 11. This performs three functions simultaneously. First, the blocks 122 and 124 tend to balance the loss of buoyancy in the front edge of the slab 112 due to formation of the hole 114. (The distance of blocks 122 and 124 from the front of the cage will have to be adjusted, depending on the weight of other cage components.) This ensures that the cage top will be level when it floats. Secondly, the forward arms of the slab 112 are strengthened by the effective doubling of their thicknesses. Thirdly, use is made of the cut-out material which otherwise would be wasted.

Preferably, the mesh size of the netting top is large enough to admit feed pellets so that feed can be dropped into the cage through the flap 116 and hole 114.

The cage 110 has the advantages of economy and simplicity. In effect, the cage consists of a simple netting container hanging upon an internal float structure, with a simple flap instead of a hinged lid. The cage 110 uses relatively inexpensive materials and is relatively easy to make, especially because very little metal forming work is required.

Although the top of the cage 110 usually will not be as strong as the tops of the cages 10 and 90, the strength can be improved by using a relatively strong plastic foam material such as closed-cell polyethylene or polypropylene for the slab material 112. Also, if desired, front-to-back metal plates can be secured in the location of the joint 119 (FIG. 11) between the blocks 122 and 124 and the slab 112 to strengthen the top.

Another advantage of the cage 110 is that it is even lighter in weight and easier to carry than the other cages described herein. Also, the float structure provides more shade for the aquatic animals than in the cage 10, for example.

Many additional modifications of the cages shown in the drawings can be made without departing from the spirit or scope of the invention.

We claim:

1. An aquatic animal cage comprising, in combination, a top structure with a foraminous basket secured to and hanging downwardly from said top structure, said top structure comprising a flat metal sheet, an elongated flexible member with a re-entrant cross-sectional shape and a longitudinal gap, said flexible member extending around the edges of said material with said edges in said gap, said foraminous basket having an upper edge located within said gap, a plurality of fasteners extending through said flexible member, said upper edge of said netting, and said edges of said sheet, and flotation means secured to said top structure to buoyantly support said cage on a body of water.

2. A cage as in claim 1 in which said flexible member is split plastic tubing and said fasteners are staples which compress and flatten said flexible member upon said upper edge of said netting.

3. A cage as in claim 1 in which said basket is made of panels of netting, said panels being joined together with further of said elongated flexible members and fasteners forming seams for said basket, with metal bar material in said further flexible members to straighten said seams and add weight to hold the panels straight when immersed in the water.

4. A cage as in claim 1 in which said sheet forms a cover for said cage, and including cross-bracing members secured to said sheet to stiffen it.

5. A cage as in claim 4 in which said sheet has an opening, a hinged lid for said opening, two of said cross-bracing members being located under the side edges of said cover to support the lid edges when the lid is closed.

6. A cage as in claim 4 in which said cover has an opening adjacent one edge, and metal bar material in said flexible member adjacent said opening to stiffen the flexible member at that location.

7. An aquatic cage comprising a top structure with a netting basket secured to and hanging downwardly from said top structure said top structure including a rigid frame, a top panel made of flexible netting and secured at its edges to said frame, said frame comprising metal pipe with a gap in it, the upper edges of said basket and the edges of said top panel being secured in said gap, a float structure secured beneath said top panel to buoyantly support said cage on a body of water, said top panel having an entrance opening, and a lid to cover said opening.

8. A cage as in claim 7 in which the shape of said top structure of said cage is substantially rectilinear, said entrance opening being located near one edge of said top structure, a pair of rigid cross-members secured between said one edge and the opposite edge of said top structure at the sides of said opening, said flotation material comprising a pair of separate floats secured to said top and extending between said one edge and the opposite edge of said top structure, and between one of said cross-members and one of said lateral edges of said top.

9. A cage as in claim 7, said basket including netting panels secured together by flexible tubing seams with fasteners therethrough, and metal bar material in the tubing at the bottom of said basket.

10. A cage as in claim 7 in which said float structure is substantially opaque and is of substantial surface area relative to the area of said top panel so as to cover a substantial area of water within said cage and thus provide both shade for animals within said basket and buoyant support for said cage on a body of water.

11. A cage as in claim 7 including a second frame, of an H-shape, said netting top panel being secured to said second frame, and said float structure comprising a pair of elongated floats aligned along the sides of the two parallel members of said frame.

12. An aquatic animal cage comprising a top structure and a basket secured to and hanging downwardly from said top structure, said top structure including a top panel made of flexible netting, and a top frame member comprised of flexible plastic pipe slit lengthwise, said basket being made of flexible netting and having an upper edge, said upper edge of said basket and the edges of said top panel extending into said pipe, staples extending through said pipe and the edges of said basket and said panel, and a float structure secured to said top structure and extending beneath substantially the entire area of said top panel, except for an entrance opening.

13. A cage as in claim 12 in which said opening is cut in said slab adjacent one edge, thus forming a U-shaped structure, a stiff member secured along the front edge of said flap and spanning the gap between the parallel legs of said U-shaped float structure, the portion of said pipe along said front edge having an edge overlapping said stiff member, said securing means comprising at least one pin secured to and extending upwardly from said stiff member, said overlapping edge of said pipe having a hole for engagement with said pin.

14. A cage as in claim 12 in which said float structure comprises a slab of float material with an exit opening in it, said netting top having a flap for covering said opening, and securing means for securing said flap in covering relationship to said opening.

15. A cage as in claim 14 in which said opening is cut in said slab adjacent one edge, thus forming a U-shaped structure, and additional floats secured under the legs of said U-shape to approximately level the top of the cage when it is floating.

16. A cage as in claim 14 in which said securing means includes means for holding opposite edges of said flap under tension to prevent it from sagging excessively.

17. An aquatic animal cage comprising a top structure and a foraminous basket secured to and hanging downwardly from said top structure, said top structure including a generally H-shaped rigid frame having substantially parallel elongated side members and a crossbar secured between said side support members, flotation material secured to said frame, and a hinged lid for said cage, said lid being hingedly attached at one edge to said crossbar.

18. A cage as in claim 17 in which the lateral edges of said lid overlap said side members, and including a front member spanning said side members at a position spaced from said crossbar, with one edge of said lid overlapping said front member.

19. A cage in claim 17 including a top plate secured to said frame and covering the area outwardly from said cross-member and between said support members.

* * * * *